United States Patent
Rao et al.

(10) Patent No.: US 12,353,711 B2
(45) Date of Patent: Jul. 8, 2025

(54) DYNAMIC CONFIGURATION OF LOGICAL STORAGE DEVICES ACCESSIBLE ACROSS MULTIPLE STORAGE SYSTEMS

(71) Applicant: Dell Products L.P., Round Rock, TX (US)

(72) Inventors: Vinay G. Rao, Bangalore (IN); Vasudevan Subramanian, Chapel Hill, NC (US); Sanjib Mallick, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 152 days.

(21) Appl. No.: 18/102,866

(22) Filed: Jan. 30, 2023

(65) Prior Publication Data

US 2024/0256125 A1    Aug. 1, 2024

(51) Int. Cl.
*G06F 3/06* (2006.01)

(52) U.S. Cl.
CPC .......... *G06F 3/0607* (2013.01); *G06F 3/0635* (2013.01); *G06F 3/0665* (2013.01); *G06F 3/0679* (2013.01)

(58) Field of Classification Search
CPC .... G06F 3/0607; G06F 3/0635; G06F 3/0665; G06F 3/0679
See application file for complete search history.

(56) References Cited

U.S. PATENT DOCUMENTS

| | | |
|---|---|---|
| 6,567,397 B1 | 5/2003 | Campana, Jr. et al. |
| 6,687,746 B1 | 2/2004 | Shuster et al. |
| 6,697,875 B1 | 2/2004 | Wilson |

(Continued)

FOREIGN PATENT DOCUMENTS

| | | |
|---|---|---|
| CN | 103677927 B | 2/2017 |
| EP | 1117028 A2 | 7/2001 |
| EP | 2667569 A1 | 11/2013 |

OTHER PUBLICATIONS

International Search Report and Written Opinion of PCT/US2019/052549 dated Dec. 4, 2019, 13 pages.

(Continued)

*Primary Examiner* — Prasith Thammavong
(74) *Attorney, Agent, or Firm* — Ryan, Mason & Lewis, LLP

(57) ABSTRACT

An apparatus in one embodiment includes at least one processing device comprising a processor coupled to a memory. The at least one processing device is configured to identify a logical storage device accessible in at least first and second storage systems, to measure response times for accessing the logical storage device in each of the first and second storage systems, and to modify, based at least in part on the measured response times, asymmetric access state settings for the logical storage device. Modifying asymmetric access state settings for the logical storage device in some embodiments illustratively comprises modifying asymmetric logical unit access (ALUA) or asymmetric namespace access (ANA) state settings for the logical storage device. Such modifications are illustratively performed in a dynamic manner that responds to variations in the measured response times so as to facilitate load balancing across storage controllers of the first and second storage systems.

20 Claims, 5 Drawing Sheets

(56) References Cited

U.S. PATENT DOCUMENTS

| | | |
|---|---|---|
| 7,275,103 B1 | 9/2007 | Thrasher et al. |
| 7,454,437 B1 | 11/2008 | Lavallee et al. |
| 7,617,292 B2 | 11/2009 | Moore et al. |
| 7,668,981 B1 | 2/2010 | Nagineni et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,201,803 B1 | 12/2015 | Derbeko et al. |
| 9,400,611 B1 | 7/2016 | Raizen |
| 9,430,368 B1 | 8/2016 | Derbeko et al. |
| 9,525,659 B1* | 12/2016 | Sonkin .................... H04L 67/02 |
| 9,594,780 B1 | 3/2017 | Esposito et al. |
| 9,647,933 B1 | 5/2017 | Tawri et al. |
| 9,672,160 B1 | 6/2017 | Derbeko et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,369 B1 | 12/2019 | Mallick et al. |
| 10,606,496 B1 | 3/2020 | Mallick et al. |
| 10,637,917 B2 | 4/2020 | Mallick et al. |
| 10,652,206 B1 | 5/2020 | Pusalkar et al. |
| 10,754,572 B2 | 8/2020 | Kumar et al. |
| 10,757,189 B2 | 8/2020 | Mallick et al. |
| 10,764,371 B2 | 9/2020 | Rao et al. |
| 10,789,006 B1 | 9/2020 | Gokam et al. |
| 10,817,181 B2 | 10/2020 | Mallick et al. |
| 10,838,648 B2 | 11/2020 | Sharma et al. |
| 10,880,217 B2 | 12/2020 | Mallick et al. |
| 10,884,935 B1 | 1/2021 | Doddaiah |
| 10,911,402 B2 | 2/2021 | Pusalkar et al. |
| 10,936,220 B2 | 3/2021 | Mallick et al. |
| 10,949,104 B2 | 3/2021 | Marappan et al. |
| 10,996,879 B2 | 5/2021 | Gokam |
| 11,016,699 B2 | 5/2021 | Anchi et al. |
| 11,016,783 B2 | 5/2021 | Rao et al. |
| 11,093,144 B1 | 8/2021 | Anchi et al. |
| 11,093,155 B2 | 8/2021 | Anchi et al. |
| 11,106,381 B2 | 8/2021 | Rao et al. |
| 11,126,363 B2 | 9/2021 | Tidke et al. |
| 11,157,203 B2 | 10/2021 | Gokam et al. |
| 11,366,590 B2 | 6/2022 | Mallick et al. |
| 11,366,771 B2 | 6/2022 | Smith et al. |
| 11,385,824 B2 | 7/2022 | Anchi et al. |
| 11,449,257 B2 | 9/2022 | Rao et al. |
| 2002/0023151 A1 | 2/2002 | Iwatani |
| 2002/0103923 A1 | 8/2002 | Cherian et al. |
| 2004/0010563 A1 | 1/2004 | Forte et al. |
| 2006/0026346 A1 | 2/2006 | Kadoiri et al. |
| 2006/0277383 A1 | 12/2006 | Hayden et al. |
| 2007/0174849 A1 | 7/2007 | Cheung et al. |
| 2008/0028163 A1 | 1/2008 | Woods et al. |
| 2008/0043973 A1 | 2/2008 | Lai et al. |
| 2008/0201458 A1 | 8/2008 | Sall |
| 2008/0301332 A1 | 12/2008 | Butler et al. |
| 2009/0259749 A1 | 10/2009 | Barrett et al. |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2012/0246345 A1 | 9/2012 | Contreras et al. |
| 2013/0117766 A1 | 5/2013 | Bax et al. |
| 2013/0339551 A1 | 12/2013 | Flanagan et al. |
| 2014/0105068 A1 | 4/2014 | Xu |
| 2015/0222705 A1 | 8/2015 | Stephens |
| 2015/0242134 A1 | 8/2015 | Takada et al. |
| 2015/0301970 A1 | 10/2015 | Armstead et al. |
| 2016/0006810 A1* | 1/2016 | Chiba ................. H04L 67/1097 |
| | | 709/219 |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0235507 A1 | 8/2017 | Sinha et al. |
| 2017/0277439 A1* | 9/2017 | Kalman .................. G06F 3/067 |
| 2018/0004425 A1* | 1/2018 | Suzuki ............... G06F 11/3034 |
| 2018/0189635 A1 | 7/2018 | Olarig et al. |
| 2018/0253256 A1 | 9/2018 | Bharadwaj |
| 2018/0317101 A1 | 11/2018 | Koue |
| 2019/0095299 A1 | 3/2019 | Liu et al. |
| 2019/0108888 A1 | 4/2019 | Sarkar et al. |
| 2019/0334987 A1 | 10/2019 | Mallick et al. |
| 2020/0021653 A1 | 1/2020 | Rao et al. |
| 2020/0045109 A1 | 2/2020 | Hegde et al. |
| 2020/0097203 A1 | 3/2020 | Mallick et al. |
| 2020/0106698 A1 | 4/2020 | Rao et al. |
| 2020/0110552 A1 | 4/2020 | Kumar et al. |
| 2020/0112608 A1 | 4/2020 | Patel et al. |
| 2020/0192588 A1 | 6/2020 | Kumar et al. |
| 2020/0204475 A1 | 6/2020 | Mallick et al. |
| 2020/0204495 A1 | 6/2020 | Mallick et al. |
| 2020/0213274 A1 | 7/2020 | Pusalkar et al. |
| 2020/0241890 A1 | 7/2020 | Mallick et al. |
| 2020/0314218 A1 | 10/2020 | Kumar et al. |
| 2020/0348860 A1 | 11/2020 | Mallick et al. |
| 2020/0348861 A1 | 11/2020 | Marappan et al. |
| 2020/0348869 A1 | 11/2020 | Gokam |
| 2020/0349094 A1 | 11/2020 | Smith et al. |
| 2020/0363985 A1 | 11/2020 | Gokam et al. |
| 2020/0372401 A1 | 11/2020 | Mallick et al. |
| 2021/0019054 A1 | 1/2021 | Anchi et al. |
| 2021/0026551 A1 | 1/2021 | Tidke et al. |
| 2021/0026650 A1 | 1/2021 | Rao et al. |
| 2021/0109658 A1 | 4/2021 | Mallick et al. |
| 2021/0157502 A1 | 5/2021 | Rao et al. |
| 2021/0181965 A1 | 6/2021 | Anchi et al. |
| 2021/0255784 A1 | 8/2021 | Anchi et al. |
| 2021/0263665 A1 | 8/2021 | Rao et al. |
| 2021/0281404 A1* | 9/2021 | Kampanakis ......... H04L 63/205 |
| 2022/0171559 A1 | 6/2022 | Anchi et al. |
| 2022/0179804 A1 | 6/2022 | Anchi et al. |
| 2022/0334725 A1* | 10/2022 | Mertes .................. G06F 16/275 |

OTHER PUBLICATIONS

International Search Report and Written Opinion of PCT/US2019/053204 dated Dec. 16, 2019, 40 pages.

International Search Report and Written Opinion of PCT/US2019/053473 dated Dec. 19, 2019, 16 pages.

International Search Report and Written Opinion of PCT/US2019/067144 dated May 4, 2020, 26 pages.

Kris Piepho, "Dell EMC SC Series Storage: Microsoft Multipath I/O," Dell EMC Best Practices, Jan. 2017, 57 pages.

NVM Express, "NVM Express, Revision 1.3," NVM Express, May 1, 2017, 282 pages.

VMware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

(56) References Cited

OTHER PUBLICATIONS

VMware, Inc. "VMware VMFS Volume Management," 2009, 8 pages.
Dell EMC, "Dell EMC Unity: Virtualization Integration," Technical White Paper, Oct. 2019, 39 pages.
Dell EMC, "Dell EMC PowerMax: ISCSI Implementation for Dell EMC Storage Arrays Running PowerMaxOS," Technical White Paper, Sep. 2019, 35 pages.
NVM Express, "NVM Express Base Specification, Revision 2.0a," NVM Express, Jul. 23, 2021, 454 pages.
NVM Express, "NVM Express Base Specification, Revision 2.0b," NVM Express, Jan. 6, 2022, 455 pages.
Dell Technologies, "Dell EMC Metro Node 7.0.1," Product Guide, Jul. 2021, 33 pages.
Dell Technologies, "Asymmetric Logical Unit Access," https://infohub.delltechnologies.com/l/dell-powervault-me5-series-vmware-vsphere-best-practices/asymmetric-logical-unit-access, Accessed Jan. 10, 2023, 1 page.
Dell Technologies, "NVMe Common Storage Elements," https://infohub.delltechnologies.com/l/nvme-nvme-tcp-and-dell-smartfabric-storage-software-overview-ip-san-solution-primer-1/nvme-common-storage-elements, Accessed Jan. 10, 2023, 6 pages.
U.S. Appl. No. 18/100,895 filed in the name of Vinay G. Rao et al. Jan. 24, 2023, and entitled "Host Device Configured to Control Active-Standby Designations for Multiple Storage Systems Using Inter-System Response Times."

* cited by examiner

DYNAMIC CONFIGURATION OF LOGICAL STORAGE DEVICES ACCESSIBLE ACROSS MULTIPLE STORAGE SYSTEMS

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. Various types of storage access protocols can be used by host devices to access the logical storage volumes or other logical storage devices of the storage system, including by way of example Small Computer System Interface (SCSI) access protocols and Non-Volatile Memory Express (NVMe) access protocols.

SUMMARY

Illustrative embodiments provide techniques for dynamic configuration of metro/stretched logical storage volumes accessible across first and second storage arrays. In some embodiments, this involves modifying asymmetric access state settings based at least in part on response time measures obtained for IO operations targeting a given metro/stretched logical storage volume in the first and second storage arrays. Such a metro/stretched logical storage volume configuration is an example of what is more generally referred to herein as an "active-active" configuration. Other configurations involving other types of logical storage devices accessible in at least first and second storage arrays or other types of storage systems may additionally or alternatively be used in other embodiments.

These and other embodiments can provide significantly improved performance, for example, in situations in which the first and second storage systems are configured such that the host device communicates with the first storage system over one or more first sets of paths and communicates with the second storage system over one or more second set of paths, where the first and second sets of paths may have substantially different performance characteristics that can also vary widely over time, possibly due at least in part to temporarily excessive IO processing loads on one or more storage controllers of the corresponding storage system.

Moreover, illustrative embodiments avoid problems that might otherwise arise where a host device is subject to restrictions in its ability to adjust asymmetric access state settings, such as being unable to change the settings to give preference to paths to a storage controller on a remote storage system as opposed to a local storage system.

For example, some embodiments herein are configured to take advantage of so-called "equidistant host" arrangements, in which the first and second storage systems are located in close proximity to one another, so as to allow the host device to change the settings to give preference to paths to a storage controller on either storage system depending on dynamically-changing factors such as load-driven response times.

In one embodiment, an apparatus comprises at least one processing device comprising a processor and a memory coupled to the processor. The at least one processing device is illustratively configured to identify a logical storage device accessible in at least first and second storage systems, to measure response times for accessing the logical storage device in each of the first and second storage systems, and to modify, based at least in part on the measured response times, asymmetric access state settings for the logical storage device.

Modifying asymmetric access state settings for the logical storage device in some embodiments illustratively comprises modifying asymmetric logical unit access (ALUA) state settings and/or asymmetric namespace access (ANA) state settings for the logical storage device. For example, in embodiments utilizing a SCSI access protocol to deliver IO operations targeting the logical storage device, ALUA state settings for the logical storage device are modified, while in other embodiments utilizing an NVMe access protocol to deliver IO operations targeting the logical storage device, ANA state settings for the logical storage device are modified. Such modifications are illustratively performed in a dynamic manner that responds to variations in the measured response times so as to facilitate load balancing across storage controllers of the first and second storage systems.

The at least one processing device illustratively comprises at least a portion of a host device, with the host device being coupled to the first and second storage systems via at least one network.

The at least one processing device in some embodiments further comprises a multi-path layer that includes at least one multi-path input-output (MPIO) driver configured to control delivery of IO operations from the host device to the first and second storage systems over selected paths through a network over which the host device communicates with the first and second storage systems.

The logical storage device is illustratively accessible to the multi-path layer via one or more first sets of paths to the first storage system and one or more second sets of paths to the second storage system.

The MPIO driver in some embodiments is illustratively configured to send one or more commands to each of the first and second storage systems and to process corresponding command responses from the first and second storage systems, and to determine, based at least in part on a difference between at least one response time for the first storage system and at least one response time for the second storage system, whether or not the host device is configured as a substantially equidistant host device relative to the first and second storage systems.

In some embodiments, modifying asymmetric access state settings for the logical storage device comprises modifying an asymmetric access state for each of one or more storage controllers of each of the first and second storage systems from an active-optimized (AO) state to an active-non-optimized (ANO) state or vice versa. For example, modifying asymmetric access state settings for the logical storage device may comprise modifying the asymmetric access states of respective first and second storage controllers of the first storage system from respective AO and ANO states to respective ANO and ANO states, and modifying the asymmetric access state of respective first and second storage controllers of the second storage system from respective ANO and ANO states to respective AO and ANO states.

Additionally or alternatively, the at least one processing device in some embodiments is further configured to perform path selection in a manner that favors accessing the logical storage device via paths to a storage controller having an AO state over paths to a storage controller having an ANO state.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
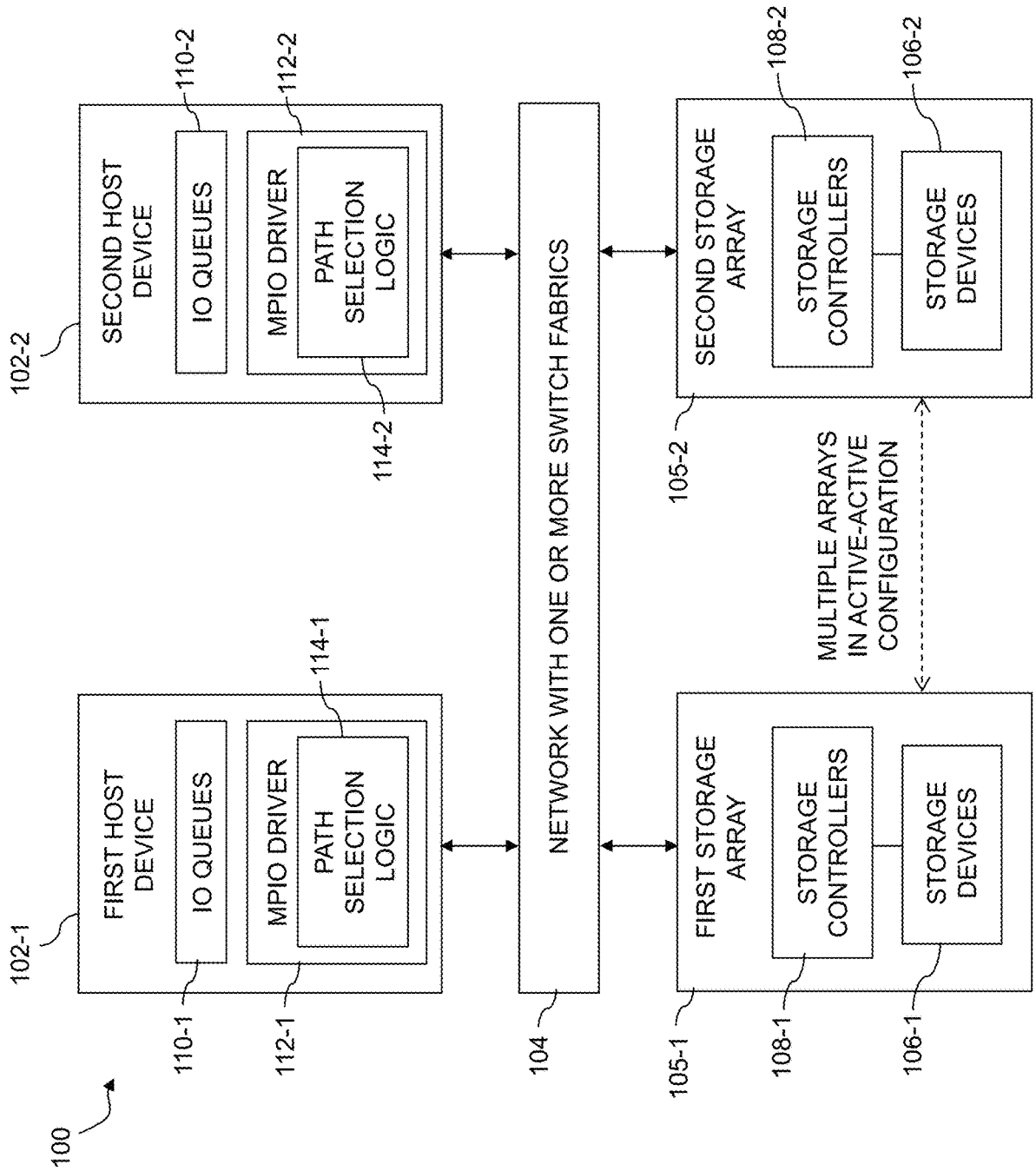
FIG. 1 is a block diagram of an information processing system configured with functionality for dynamic configuration of logical storage devices accessible across multiple storage systems in an illustrative embodiment.

FIG. 1 shows an information processing system 100 configured in accordance with an illustrative embodiment. The information processing system 100 comprises at least first and second host devices 102-1 and 102-2, collectively referred to herein as host devices 102. The host devices 102 are coupled to a network 104 that comprises one or more switch fabrics. The host devices 102 communicate over the network 104 via the one or more switch fabrics with at least first and second storage arrays 105-1 and 105-2, also collectively referred to herein as first and second storage arrays 105, or simply storage arrays 105. For example, in some embodiments the network 104 illustratively comprises at least one storage area network (SAN) and the one or more switch fabrics illustratively comprise respective distinct switch fabrics of a set of multiple switch fabrics interconnecting the host devices 102 with the storage arrays 105 over the one or more SANs. Each of the one or more switch fabrics in some embodiments is associated with a different SAN.

The system 100 may be configured such that the first host device 102-1 communicates with the first storage array 105-1 over a first switch fabric and communicates with the second storage array 105-2 over a second switch fabric. Similarly, the second host device 102-2 can communicate with the first storage array 105-1 over the first switch fabric and communicate with the second storage array 105-2 over the second switch fabric. Numerous other interconnection arrangements are possible.

Also, other types of networks can be used in other embodiments, and references to SANs, switch fabrics or other particular network arrangements herein are for purposes of illustration only, as non-limiting examples.

Although only two host devices 102 and two storage arrays 105 are shown in the figure, this is by way of illustrative example only, and other embodiments can include additional instances of such elements. It is also possible that alternative embodiments may include only a single host device and/or a single storage array.

The host devices 102 illustratively comprise respective computers, servers or other types of processing devices configured to communicate with the storage arrays 105 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 may be implemented using multiple networks of different types to interconnect the various components of the information processing system 100. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) and/or other types of communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although illustratively shown as separate from the network 104 in the figure, at least portions of the storage arrays 105 may be considered part of the network 104 in some embodiments. For example, in embodiments in which the network 104 comprises at least one SAN, the storage arrays 105 may be viewed as part of the one or more SANs.

The first and second storage arrays 105-1 and 105-2 comprise respective sets of storage devices 106-1 and 106-2, collectively referred to herein as storage devices 106, coupled to respective sets of storage controllers 108-1 and 108-2, collectively referred to herein as storage controllers 108. The storage controllers 108 may comprise, for example, storage processors, service processors, and/or other arrangements of processing circuitry configured to process IO operations received by the corresponding storage array. The term "storage controller" as used herein is therefore intended to be broadly construed, so as to encompass these and other arrangements, such as processing devices that are more particularly referred to herein as storage array processors. Each of the storage controllers 108 illustratively has one or more ports associated therewith for supporting communications between the storage arrays 105 and the host devices 102 over the network 104.

The storage devices 106 of the storage arrays 105 illustratively comprise solid state drives (SSDs). Such SSDs in some embodiments are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of storage devices may also be used. For example, hard disk drives (HDDs) can be used in combination with or in place of SSDs or other types of NVM devices.

A given storage system as the term is broadly used herein can therefore include a combination of different types of storage devices, as in the case of a multi-tier storage system comprising, for example, a memory-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives, NVM drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, NVM drives, hybrid drives or other types of storage devices. In some embodiments, at least one of the storage arrays 105 illustratively comprises one or more PowerMax™ or PowerStore™ storage arrays, commercially available from Dell Technologies.

As another example, one or both of the storage arrays 105 may comprise respective clustered storage systems, each including a plurality of storage nodes interconnected by one or more networks. An example of a clustered storage system of this type is a scale-out all-flash content addressable storage array distributed over multiple storage nodes.

A given storage system as the term is broadly used herein can additionally or alternatively comprise, for example, network-attached storage (NAS), direct-attached storage (DAS) and distributed DAS.

Other additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

As mentioned above, communications between the host devices 102 and the storage arrays 105 within the system 100 may utilize PCIe connections or other types of connections implemented over one or more networks such as network 104. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 105 in some embodiments may be implemented as part of cloud infrastructure in the form of a cloud-based system.

As is apparent from the foregoing, terms such as "storage array" and "storage system" as used herein are intended to be broadly construed, and a given such storage array or storage system may encompass, for example, multiple distinct instances of a commercially-available storage array.

The storage devices 106 of the storage arrays 105 are configured to store data utilized by one or more applications running on one or more of the host devices 102. The storage devices 106 on one of the storage arrays 105 are illustratively arranged in one or more storage pools. The storage arrays 105 and their corresponding storage devices 106 are examples of what are more generally referred to herein as "storage systems." A given such storage system in the present embodiment may be shared by the host devices 102, and in such arrangements may be referred to as a "shared storage system."

The storage devices 106 of the storage arrays 105 illustratively implement logical units (LUNs) configured to store objects for users associated with the host devices 102. These objects can comprise files, blocks or other types of objects. The host devices 102 interact with the storage arrays 105 utilizing read and write commands as well as other types of commands that are transmitted over the network 104. The above-noted LUNs are examples of what are more generally referred to herein as logical storage volumes, or still more generally, logical storage devices.

The read and write commands in some embodiments more particularly comprise SCSI commands, although other types of commands may be used in other embodiments, including commands that are part of a standard command set, such as NVMe commands, or custom commands such as a "vendor unique command" or VU command that is not part of a standard command set.

A given IO operation as that term is broadly used herein illustratively comprises one or more such commands. References herein to terms such as "input-output" and "IO" should be understood to refer to input and/or output. Thus, an IO operation relates to at least one of input and output.

For example, an IO operation can comprise at least one read IO operation and/or at least one write IO operation. More particularly, IO operations may comprise write requests and/or read requests directed to stored data of a given one of the storage arrays 105.

Each IO operation is assumed to comprise one or more commands for instructing at least one of the storage arrays 105 to perform particular types of storage-related functions such as reading data from or writing data to particular logical storage volumes or other logical storage devices of one or more of the storage arrays 105. Such commands are assumed to have various payload sizes associated therewith, and the payload associated with a given command is referred to herein as its "command payload."

A command directed by one of the host devices 102 to one of the storage arrays 105 is considered an "outstanding" command until such time as its execution is completed in the viewpoint of the sending host device, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

Also, the term "storage device" as broadly used herein can encompass, for example, a logical storage device such as a LUN or other logical storage volume. A logical storage device can be defined in the storage arrays 105 to include different portions of one or more physical storage devices. The storage devices 106 may therefore be viewed as comprising respective LUNs or other logical storage volumes.

Each of the host devices 102 illustratively has multiple paths to each of the storage arrays 105 via the network 104, with at least one of the storage devices 106 of one of the storage arrays 105 being visible to that host device on a given one of the paths, although numerous other arrangements are possible. A given one of the storage devices 106 may be accessible to a given host device over multiple paths. Different ones of the host devices 102 can have different numbers and types of paths to the storage arrays 105.

Different ones of the storage devices 106 of the storage arrays 105 illustratively exhibit different latencies in processing of IO operations. In some cases, the same storage device may exhibit different latencies for different ones of multiple paths over which that storage device can be accessed from a given one of the host devices 102.

The host devices 102, network 104 and storage arrays 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

As a more particular example, the host devices 102 in some embodiments illustratively comprise an ESXi environment or other type of host environment that supports non-disruptive movement of applications between ESXi servers or other types of servers, possibly using vMotion or other similar techniques to move VMs, in which those application execute, from one server to another server.

Additional examples of processing platforms utilized to implement storage systems and possibly one or more associated host devices in illustrative embodiments will be described in more detail below.

The host devices 102 and the storage arrays 105 may be implemented on respective distinct processing platforms, although numerous other arrangements are possible. For example, in some embodiments at least portions of the host devices 102 and the storage arrays 105 are implemented on the same processing platform. The storage arrays 105 can therefore be implemented at least in part within at least one processing platform that implements at least a subset of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 105. The storage arrays 105 can be similarly distributed across multiple data centers.

Although in some embodiments certain commands used by the host devices 102 to communicate with the storage arrays 105 illustratively comprise SCSI commands, other types of commands and command formats can be used in other embodiments. For example, some embodiments can implement IO operations utilizing command features and functionality associated with the NVMe access protocol, as described in the NVMe Base Specification, Revision 2.0b, Jan. 6, 2022, which is incorporated by reference herein. Other storage access protocols of this type that may be utilized in illustrative embodiments disclosed herein include NVMe over Fabric, also referred to as NVMeoF, and NVMe over Transmission Control Protocol (TCP), also referred to as NVMe/TCP.

It is assumed in illustrative embodiments that the storage arrays 105 are arranged in a so-called metro and/or stretched ("metro/stretched") configuration or other type of active-active configuration. As a more particular illustration, the first and second storage arrays 105-1 and 105-2 in some embodiments may be arranged in an active-active configuration, although use of such a configuration is not required. In an example of an active-active configuration that may be used, data stored in one of the storage arrays 105 is replicated to the other one of the storage arrays 105 utilizing a replication process. Such data replication across the multiple storage arrays 105 can be used to facilitate failure recovery in the system 100. One of the storage arrays 105 may therefore operate as a production storage array relative to the other storage array which operates as a backup or recovery storage array. Examples of active-active configurations include "metro" or "stretched" high availability storage array configurations. The term "active-active configuration" as used herein is therefore intended to be broadly construed.

Moreover, the storage arrays 105 in some embodiments are assumed to be located in close proximity to one another, such as in the same data center or otherwise separated by less than a threshold amount of distance. In such an arrangement, a given one of the host devices 102 is also referred to herein as an "equidistant host" as such a host device is substantially equidistant to both of the storage arrays 105. Such an arrangement is illustratively indicated by the physical locations of the two storage arrays being less than a specified distance threshold apart from one another. The distance threshold may be, for example, 10 meters, 100 meters, 1 kilometer or other values, as appropriate for a given implementation. It is to be appreciated, however, that other embodiments herein do not require such an arrangement.

The first and second storage arrays 105-1 and 105-2 in some embodiments may be configured to participate in a replication process, such as a synchronous replication process. In accordance with one type of synchronous replication process, a given one of the host devices 102 writes data to one of the storage arrays 105, and that host device receives an acknowledgement of success only after the data has been successfully written to both of the storage arrays 105. For example, if the host device directs a write to the first storage array 105-1, that storage array mirrors the write to the second storage array 105-2 and receives an acknowledgement of success back from the second storage array 105-2. The first storage array 105-1 then responds back to the host device with an acknowledgement of success.

This type of synchronous replication process is therefore configured to mirror data writes from one or more of the host devices 102 to both of the storage arrays 105. Other types of replication processes may be used in other embodiments.

For example, a "replication process" as that term is broadly used herein may include both asynchronous and synchronous replication modes as well as support for concurrent operation of such modes and separate operation of the individual modes. It is also possible in some embodiments that a given replication process implemented using storage arrays 105 may comprise only synchronous replication or only asynchronous replication, instead of multiple distinct replication modes.

A given logical storage device implemented on one or both of the storage arrays 105 in the system 100 illustratively comprises a set of one or more LUNs or other logical storage volumes of one or both of the storage arrays 105. Each such LUN or other logical storage volume is assumed to comprise at least a portion of a physical storage space of one or more of the storage devices 106 of the corresponding storage arrays 105.

The host devices 102 comprise respective sets of IO queues 110-1 and 110-2, and respective MPIO drivers 112-1 and 112-2. The MPIO drivers 112 collectively comprise a multi-path layer of the host devices 102. The multi-path layer provides functionality for dynamic configuration of logical storage devices using respective instances of path selection logic 114-1 and 114-2 implemented within the MPIO drivers 112.

The MPIO drivers 112 may comprise, for example, otherwise conventional MPIO drivers, such as PowerPath® drivers from Dell Technologies, suitably modified in the manner disclosed herein to support at least portions of the disclosed functionality for dynamic configuration of logical storage devices. Other types of MPIO drivers from other driver vendors may be suitably modified to incorporate functionality for dynamic configuration of logical storage devices as disclosed herein.

The MPIO driver 112-1 is configured to select IO operations from its corresponding set of IO queues 110-1 for delivery to the storage arrays 105 over the network 104. The sources of the IO operations stored in the set of IO queues 110-1 illustratively include respective processes of one or more applications executing on the host device 102-1.

The paths over which the IO operations are sent from the host device 102-1 to the storage arrays 105 illustratively comprise paths associated with respective initiator-target pairs, with each initiator comprising a host bus adaptor (HBA) or other initiating entity of the host device 102-1 and each target comprising a storage array port or other targeted entity corresponding to one or more of the storage devices 106 of the storage arrays 105. As noted above, the storage devices 106 of the storage arrays 105 illustratively comprise LUNs or other types of logical storage devices.

For example, in selecting particular ones of the paths for delivery of the IO operations to the storage arrays 105, the path selection logic 114-1 of the MPIO driver 112-1 illustratively implements a path selection algorithm that selects particular ones of the paths at least in part as a function of path information such as host device HBA and storage array port, with the path selection algorithm being configured to balance the IO operations over the paths or to achieve other load balancing or performance goals. In illustrative embodiments, such path selection is advantageously based at least in part on dynamically-modified asymmetric access state settings, such as ALUA/ANA state settings, as disclosed herein.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical storage device of one of the storage arrays 105. The corresponding logical storage device illustratively comprises a LUN or other logical storage volume to which the particular IO operation is directed.

A given retry of a failed IO operation under such a path selection algorithm can select a path having a different host device HBA and storage array port for a given retry than that of the path selected for the original failed IO operation.

The paths between the host devices 102 and the storage arrays 105 can change over time. For example, the addition of one or more new paths from host device 102-1 to the storage arrays 105 or the deletion of one or more existing paths from the host device 102-1 to the storage arrays 105 may result from respective addition or deletion of at least a portion of the storage devices 106 of the storage arrays 105. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage arrays 105 as well to discover the disappearance of any existing LUNs that have been deleted from the storage arrays 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the corresponding one of the storage arrays 105 that the host device 102-1 has discovered the new path.

As is apparent from the foregoing, MPIO driver 112-1 of host device 102-1 is configured to control delivery of IO operations from the host device 102-1 to the first and second storage arrays 105 over selected paths through the network 104.

The MPIO driver 112-1 is also illustratively configured to implement, utilizing its path selection logic 114-1, at least portions of the disclosed functionality for dynamic configuration of logical storage devices in the host device 102-1. This aligned path functionality in illustrative embodiments herein is assumed to include measuring response times for accessing one or more LUNs, logical storage volumes or other logical storage devices, and modifying, based at least in part on the measured response times, asymmetric access state settings for at least one of the logical storage devices, as will be described in more detail below. Other host device components, such as logic components implemented in one or more host device processors external to the MPIO driver 112-1, can additionally or alternatively implement aspects of such functionality of the host device 102-1. The disclosed embodiments are therefore not limited to embodiments in which functionality for dynamic configuration of logical storage devices is controlled at least in part by an MPIO driver or multi-path layer.

Illustrative embodiments disclosed herein advantageously address and overcome problems that might otherwise arise when selecting paths for delivery of IO operations to storage arrays under the control of a host device.

For example, some embodiments disclosed herein can provide significantly improved performance in situations in which the storage arrays 105 are configured in accordance with a metro/stretched arrangement or other similar arrangement in which the host device 102-1 communicates with the first storage array 105-1 over a first set of paths and communicates with the second storage array 105-2 over a second set of paths, where the first and second sets of paths may have substantially different performance characteristics that are also subject to significant variations over time.

In accordance with the functionality for dynamic configuration of logical storage devices as disclosed herein, a given one of the host devices 102, illustratively the host device 102-1, is configured to identify a logical storage device accessible in the first and second storage arrays 105, to measure response times for accessing the logical storage device in each of the first and second storage arrays 105, and to modify, based at least in part on the measured response times, asymmetric access state settings for the logical storage device. The host device 102-1 is further configured to implement path selection for delivery of IO operations targeting the logical storage device based at least in part on the asymmetric access state settings for the logical storage device. Such functions associated with dynamic configuration of the logical storage device are illustratively performed at least in part by the MPIO driver 112-1 of the host device 102-1 via the path selection logic 114-1.

The host device 102-1 is an example of what is more generally referred to herein as "at least one processing device" that includes a processor coupled to a memory. Other types and arrangements of one or more processing devices may be utilized in other embodiments to implement the disclosed functionality for dynamic configuration of logical storage devices.

In some embodiments, such as those utilizing a SCSI access protocol, modifying asymmetric access state settings for the logical storage device comprises modifying ALUA state settings for the logical storage device, and in other embodiments, such as those utilizing an NVMe access protocol, modifying asymmetric access state settings for the logical storage device comprises modifying ANA state settings for the logical storage device, although other types of asymmetric access state settings can be used in other embodiments. The term "asymmetric access state settings" as used herein is therefore intended to be broadly construed so as to encompass these and other types of information.

The MPIO driver 112-1 is illustratively configured to send commands to the first and second storage arrays 105 and to process corresponding command responses for each of a plurality of paths in order to obtain at least portions of the measured response times. Such commands in some embodiments include commands that do not incur significant processing delays in the storage arrays 105. Examples of such commands include the SCSI vendor unique command 0xC3, the SCSI test unit ready (TUR) command, and the NVMe Identify command. Additionally or alternatively, other types of commands can be used, including IO operations that would normally be sent by the MPIO driver 112-1 to the storage arrays 105 in accessing one or more logical storage devices.

These and/or other commands can be used, for example, to determine if the storage arrays 105 are located in sufficient proximity to one another for the host device 102-1 to be considered what is referred to herein as an "equidistant host."

For example, the MPIO driver 112-1 in some embodiments is configured to send one or more commands to each of the first and second storage arrays 105 and to process corresponding command responses from the first and second storage arrays 105, and to determine, based at least in part on a difference between at least one response time for the first storage array 105-1 and at least one response time for the second storage array 105-2, whether or not the host device 102-1 is configured as an equidistant host device relative to the first and second storage arrays 105. In some embodiments, first and second response times from respective ones of the first and second storage arrays 105 are first converted to distance measures using the speed of light, and a difference between the distance measures is compared to a distance threshold, such as, for example, 10 meters, 100 meters or 1 kilometer, in order to determine if the storage arrays 105 are sufficiently close to one another to designate host device 102-1 as an equidistant host. Similar comparisons to a threshold can be done without converting the response times to distance, and/or using averages or other functions of multiple response times for each of the storage arrays 105. Other distance and/or response time thresholds may be used, depending upon the particular performance needs of a given system implementation.

As indicated previously, other additional or alternative commands, including read and/or write commands that are part of normal IO operations in the system 100, can be used, in any combination. Some of the commands may include commands such as those noted above that do not incur substantial processing delay in the storage arrays 105, while others comprise read and/or write commands that do incur such delays.

In some embodiments, measuring response times for accessing a given logical storage device in each of the first and second storage arrays 105 in some embodiments comprises collecting response time measurements for respective IO operations directed to the logical storage device, and/or one or more other logical storage devices each accessible in at least one of the storage arrays 105, over a designated period of time. An average or other function of multiple response times can be computed for each of the storage arrays 105.

A given logical storage device is illustratively accessible to the MPIO driver 112-1 via one or more first sets of paths to the first storage array 105-1 and one or more second sets of paths to the second storage array 105-2.

In some embodiments, modifying asymmetric access state settings for the logical storage device comprises modifying an asymmetric access state for each of one or more storage controllers 108 of each of the first and second storage arrays 105 from an active-optimized (AO) state to an active-non-optimized (ANO) state or vice versa. As mentioned above, each of the storage controllers 108 illustratively has at least one port associated therewith in its corresponding one of the first and second storage arrays 105.

As a more particular example, modifying asymmetric access state settings for the logical storage device comprises modifying the asymmetric access states of respective first and second storage controllers 108 of the first storage system from respective AO and ANO states to respective ANO and ANO states, and modifying the asymmetric access state of respective first and second storage controllers 108 of the second storage system from respective ANO and ANO states to respective AO and ANO states.

The MPIO driver 112-1 in some embodiments is further configured to perform path selection via its path selection logic 114-1 in a manner that favors accessing the logical storage device via paths to a storage controller having an AO state over paths to a storage controller having an ANO state. For example, path weightings or one or more other characteristics of a path selection algorithm, load balancing algorithm or other type of algorithm implemented by the path selection logic 114-1 are illustratively adjusted to favor accessing the logical storage device via paths to a storage controller having an AO state over paths to a storage controller having an ANO state.

In another example of such an arrangement, a path selection algorithm that weights the paths in its selection process such that more heavily weighted paths to a given logical storage device are selected prior to less heavily weighted paths to the given logical storage device, for delivery of an IO operation targeting the given logical storage device, weights assigned to paths associated with an AO state can be increased while weights assigned to paths associated with an ANO state can be decreased, relative to weights that would otherwise have been used for path selection absent use of the techniques disclosed herein. Other types of weight adjustments can be implemented in other embodiments.

As indicated previously, in some embodiments, the first and second storage arrays 105 are arranged in a metro/stretched configuration relative to one another, or another type of active-active configuration relative to one another. Other types of configurations involving at least first and second storage arrays can be used.

It should be noted that metro/stretched configurations and other active-active configurations are used in many modern data centers. In an example of such a configuration, a given logical unit or LUN, also referred to herein as a logical storage volume or logical storage device, is exposed through two distinct storage arrays, providing a consistent view of the logical storage volume with its data synchronized in both storage arrays. In a uniform host connectivity arrangement, a given host device is connected to both of the storage arrays in the metro/stretched configuration, as illustrated in the FIG. 1 embodiment, such that a given logical storage volume is accessible via multiple paths to both storage arrays.

In one or more such configurations, a given LUN, logical storage volume or other logical storage device is illustratively accessible to the multi-path layer of the host device 102-1 via one or more first sets of paths to the first storage array 105-1 and one or more second sets of paths to the second storage array 105-2.

For example, the first and second sets of paths may be associated with two different "legs" of a metro/stretched configuration, active-active configuration or other configuration involving two different storage arrays 105, possibly at different physical locations, although numerous alternative configurations are possible. Each of the arrays is illustratively associated with or "on" a corresponding one of the legs. Some embodiments herein provide an advantageous methodology to ensure that performance is not undermined even when the two arrays on the two legs have substantially different performance characteristics that vary over time due to temporary loading issues and/or other factors.

Additional illustrative embodiments of the above-described techniques for dynamic configuration of logical storage devices will now be presented. These embodiments are described in the context of ALUA state information, but can be adapted in a straightforward manner to ANA state information.

In some embodiments to be described, it is assumed that the storage arrays 105 comprise respective PowerStore® storage arrays, commercially available from Dell Technologies. Such arrays may also be referred to as respective "appliances," each having two or more storage controllers, which in the PowerStore® context are referred to as "nodes." It is to be appreciated that a wide variety of different storage arrays having different configurations can be used in other embodiments.

In some embodiments, one or more metro/stretched volumes are implementing using a so-called "equidistant" configuration in which the two storage arrays 105 are located in close proximity to one another, such as in the same data center, such that each may be considered substantially equidistant from the host device 102-1. In some arrangements of this type, the host device 102-1 is also referred to as an "equidistant host."

The host device 102-1 in some embodiments illustratively includes a mechanism to load balance across multiple storage controllers of an array using an approach known as dynamic ALUA, which takes into account the IO load on the storage controllers of the arrays and modifies access preference accordingly for one or more volumes. The volume preference of accessibility changes the ALUA access states for the paths making the host device drive the IO to the ALUA optimized paths, thereby improving overall performance.

Such arrangements can be potentially problematic in the context of equidistant metro/stretched configurations, in which the latency from the given host device to each of the two arrays is similar, due to the physical proximity of the two arrays. For example, dynamic ALUA techniques are sometimes limited to changing the volume preference within a given one of the arrays, even if the other array is known to be in close proximity to the given array via the above-noted equidistant metro/stretched configuration and furthermore is known to be relatively lightly loaded compared to the given array.

These and other issues are addressed in illustrative embodiments disclosed herein. For example, in some embodiments, the MPIO driver 112-1 of host device 102-1 identifies the metro/stretched configuration for one or more logical storage volumes, and obtains SAN round-trip response time measurements for both of the storage arrays 105, illustratively using a vendor unique command such as, for example, the SCSI vendor unique command 0xC3, the SCSI TUR command, or an Identify command in the NVMe context. Additionally or alternatively, the MPIO driver 112-1 may collect IO response time measurements, illustratively for all or a subset of read IOs and write IOs over a specified period of time, and may normalize the response time measurements made for the various IO request sizes to a particular size such as 4K in order to facilitate comparison.

In some situations involving a heavy IO processing load, there will be a spike in the read/write IO response time. As the MPIO driver 112-1 in illustrative embodiments herein has knowledge of the latency of access to the storage arrays, it can change the preference of access of one or more of the logical storage volumes from one of the arrays (e.g., a "local" array) to the other one of the arrays (e.g., a "remote" array). Such a change in access preference is illustratively implemented at least in part utilizing explicit ALUA commands. Explicit ALUA commands are standard SCSI commands which can be used to change the ALUA access preference. Such commands can be used, for example, to change the ALUA access state of the storage controllers of the local array to ANO and the ALUA access state of a given one of the storage controllers of the remote array to AO. Once the ALUA access states are changed in this manner, the MPIO driver 112-1 via its path selection logic 114-1 will send IOs preferentially to the given storage controller of the remote array which now has the AO access state. The MPIO driver 112-1 can determine the particular manner in which to change ALUA access states for particular ones of the metro/stretched logical storage volumes in order to keep the load across the arrays suitably balanced. The changes in ALUA access state made using the techniques disclosed herein are illustratively dynamic, and are responsive to changes in the IO response time measurements over time.

Such an arrangement in illustrative embodiments allows the MPIO driver 112-1 of host device 102-1 to reduce access latency for metro/stretched volumes by leveraging equidistant storage arrays 105 in the metro/stretched configuration. The MPIO driver 112-1 illustratively utilizes its knowledge of the access latencies to local and remote arrays in the metro/stretched configuration to control changes in ALUA access preferences via explicit ALUA commands, thereby facilitating load balancing and improving overall performance. As mentioned previously, similar arrangements can be implemented in the NVMe context using ANA commands in place of the above-noted SCSI ALUA commands.

As indicated previously, at least portions of the functionality for dynamic configuration of logical storage devices in illustrative embodiments is implemented within or otherwise utilizing the MPIO driver 112-1 and its path selection logic 114-1.

Although MPIO driver 112-1 and its path selection logic 114-1 are utilized to perform certain aspects of the functionality for dynamic configuration of logical storage devices in some embodiments, this is by way of illustrative example only, and other embodiments need not utilize MPIO drivers in implementing such functionality. For example, Linux native multi-pathing arrangements utilizing device mappers, or other types and arrangements of host device components, can be configured to implement dynamic configuration of logical storage devices as disclosed herein.

In addition, although the above-described functionality for dynamic configuration of logical storage devices is primarily described above in the context of host device 102-1 and its MPIO driver 112-1, it is assumed that similar functionality for dynamic configuration of logical storage devices is implemented by host device 102-2 and its MPIO driver 112-2. The MPIO driver 112-2 is therefore similarly configured to select IO operations from its corresponding one of the sets of IO queues 110 for delivery to the storage arrays 105 over the network 104 and to perform at least portions of the disclosed functionality for dynamic configuration of logical storage devices. Additional or alternative host device components, such as additional or alternative logic components logic implemented in the host device, can be used to control performance of one or more steps of the example process to be described below in conjunction with FIG. 2 or other algorithms in illustrative embodiments.

It is to be appreciated that the above-described features of system 100 and other features of other illustrative embodiments are presented by way of example only, and should not be construed as limiting in any way. Accordingly, different numbers, types and arrangements of system components such as host devices 102, network 104, storage arrays 105, storage devices 106, sets of IO queues 110, MPIO drivers 112 and instances of path selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, as indicated previously, additional or alternative logic instances or other components implemented in one or more of the host devices 102 and the storage arrays 105 can be used to perform at least portions of the functionality for dynamic configuration of logical storage devices.

The operation of the information processing system 100 will now be described in further detail with reference to the flow diagram of the illustrative embodiment of FIG. 2. The process as shown includes steps 200 through 206, and is suitable for use in the system 100 but is more generally applicable to other types of systems comprising at least one host device and at least first and second storage arrays or other types of first and second storage systems. The host device illustratively comprises a given one of the first and second host devices 102-1 and 102-2 of FIG. 1, and the first and second storage arrays illustratively comprise respective ones of the storage arrays 105, with each such storage array comprising a plurality of storage devices. The storage devices of each such storage array are assumed to include logical storage devices such as LUNs or other logical storage volumes.

Figure 2:
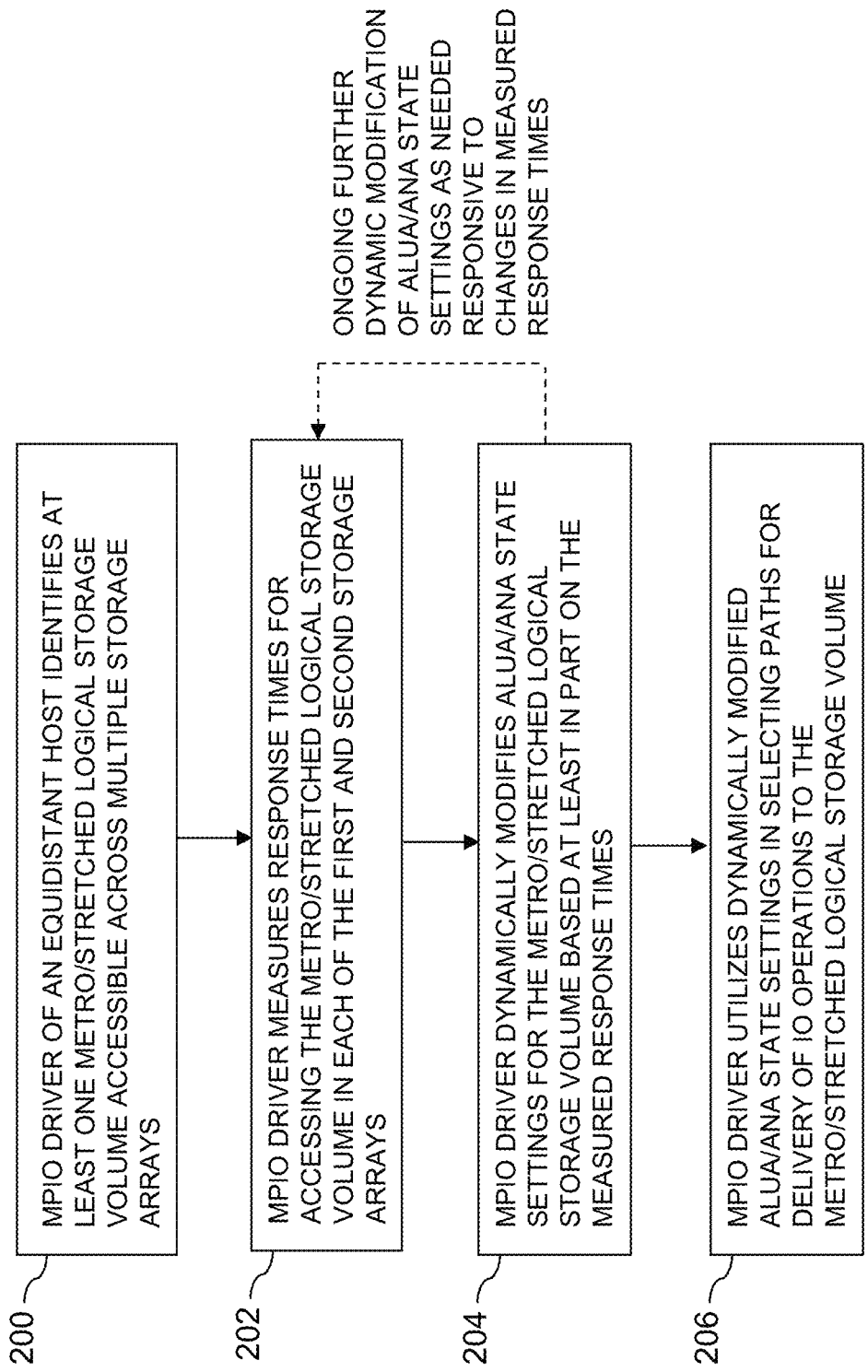
FIG. 2 is a flow diagram illustrating an example process for dynamic configuration of logical storage devices accessible across multiple storage systems in an illustrative embodiment.

The steps of the FIG. 2 process are illustratively performed at least in part by or under the control of an MPIO layer comprising one or more MPIO drivers of respective host devices, such as the MPIO drivers 112-1 and 112-2 of the first and second host devices 102-1 and 102-2 of system 100, although other arrangements of system components can control or perform at least portions of one or more of the steps in other embodiments. At least portions of the functionality of the FIG. 2 process may be performed at least in part in conjunction with a load balancing algorithm or other type of path selection algorithm executed by instances of path selection logic 114 of one or more MPIO drivers 112. A given host device is referred to as simply a "host" in some description herein.

In step 200, an MPIO driver of a host device of an equidistant host identifies at least one metro/stretched logical storage volume accessible across multiple storage arrays including at least first and second storage arrays. The host device in this embodiment is more particularly referred to as an "equidistant host" in that the first and second storage arrays are assumed to be located in close proximity to one another, such as within the same data center, so as to be considered substantially equidistant from the host device.

The first and second storage arrays are illustratively arranged, for example, in a metro/stretched configuration or other active-active configuration providing access to LUNs or other types of logical storage devices that are replicated across the two storage arrays. Each of the logical storage devices illustratively comprises a LUN or other type of logical storage volume or logical storage device implemented using one or more storage devices of the first and second storage arrays.

In some embodiments, the MPIO driver, prior to or as an initial portion of step 200, sends one or more commands to each of the first and second storage arrays and processes corresponding command responses from the first and second storage arrays, and determines, based at least in part on a difference between at least one response time for the first storage array and at least one response time for the second storage array, whether or not the host device is configured as a equidistant host device relative to the first and second storage arrays. It is assumed in the FIG. 2 process that the MPIO driver has made an affirmative determination on such an assessment, or has otherwise determined that the host device is configured as an equidistant host device relative to the first and second storage arrays, possibly based on prior knowledge of actual physical locations of the two storage arrays, such as prior knowledge of the two storage arrays being within a same data center.

In step 202, the MPIO driver measures response times for accessing the metro/stretched logical storage volume in each of the first and second storage arrays. For example, the MPIO driver is illustratively configured to send commands to the first and second storage arrays and to process corresponding command responses for each of a plurality of paths over which the metro/stretched logical storage volume is accessible in order to obtain at least portions of the measured response times. Such commands can be part of IO operations sent by the MPIO driver to the first and second storage arrays as part of its functionality for controlling delivery of IO operations to the first and second storage arrays. Additionally or alternatively, such commands can include other types of commands that are not part of IO operations that target one or more logical storage volumes of one or both of the first and second storage arrays. In some embodiments, measuring response times for accessing the logical storage device in each of the first and second storage systems comprises collecting response time measurements for respective IO operations directed to the metro/stretched logical storage device over a designated period of time. It is to be appreciated that numerous alternative arrangements for measuring response times can be used.

In step 204, the MPIO driver dynamically modifies ALUA/ANA state settings for the metro/stretched logical storage volume based at least in part on the measured response times. For example, modifying ALUA/ANA state settings for the metro/stretched logical storage volume in some embodiments comprises modifying an asymmetric access state for each of one or more storage controllers of each of the first and second storage arrays from an AO state to an ANO state or vice versa. As a more particular example, modifying ALUA/ANA state settings for the metro/stretched logical storage volume comprises modifying the asymmetric access states of respective first and second storage controllers of the first storage array from respective AO and ANO states to respective ANO and ANO states, and modifying the asymmetric access state of respective first and second storage controllers of the second storage array from respective ANO and ANO states to respective AO and ANO states. Other types of changes in asymmetric access state settings can be made in other embodiments. Also, further changes can be made over time, responsive to changes in measured response times, so as to implement a dynamic time-varying modification of the asymmetric access state settings.

In step 206, the MPIO driver utilizes the dynamically modified ALUA/ANA state settings in selecting paths for delivery of IO operations to the metro/stretched logical storage volume on the first and second storage arrays.

As indicated by the dashed line in the figure, steps 202 and 204 may be substantially continually repeated, illustratively as a background portion of the process performed at least in parallel with performance of one or more instances of step 206, so as to provide ongoing further dynamic modification of ALUA/ANA state settings as needed responsive to changes in measured response times.

The steps of the FIG. 2 process are shown in sequential order for clarity and simplicity of illustration only, and certain steps can at least partially overlap with other steps. Also, different ones of the steps can be performed at least in part by different host device components, such as additional or alternative components of the host device. Such components are illustratively part of an MPIO layer comprising one or more MPIO drivers, but in other embodiments can be implemented elsewhere in the host device.

As indicated above, different instances of the FIG. 2 process can execute at least in part in parallel with one another for different path selection processes involving different logical storage devices or other components. Also, multiple additional instances of the FIG. 2 process can be performed in respective ones of one or more additional host devices that share the first and second storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for dynamic configuration of logical storage devices. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different dynamic configuration arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
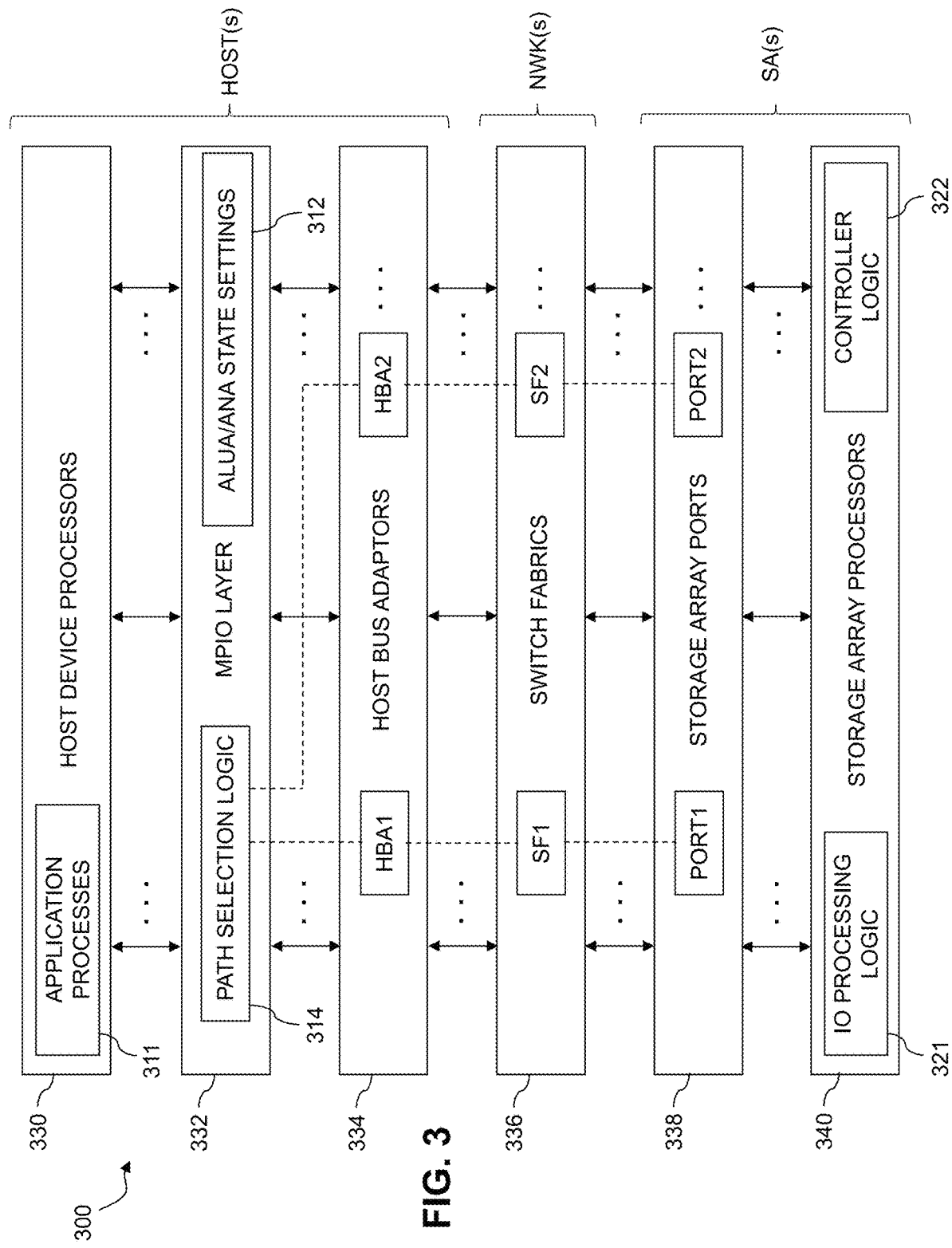
FIG. 3 is a block diagram showing multiple layers of a layered system architecture that includes functionality for dynamic configuration of logical storage devices accessible across multiple storage systems in an illustrative embodiment.

Referring now to FIG. 3, another illustrative embodiment is shown. In this embodiment, an information processing system 300 comprises host-side components that include ALUA/ANA state settings 312 and path selection logic 314, and storage-side components that include IO processing logic 321 and controller logic 322. Additional or alternative host-side and storage-side components can be used in other embodiments. The system 300 is configured in accordance with a layered system architecture that illustratively includes a host device processor layer 330, an MPIO layer 332, an HBA layer 334, a switch fabric layer 336, a storage array port layer 338 and a storage array processor layer 340. As illustrated in the figure, the host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements functionality for dynamic configuration of logical storage devices accessible across multiple storage arrays. Paths selected by the path selection logic 314 are utilized to access logical storage devices of the storage arrays, with the logical storage devices storing data for one or more application processes 311 running in one or more host device processors of the host device processor layer 330. The functionality for dynamic configuration of logical storage devices in this embodiment is assumed to be controlled at least in part by the path selection logic 314, although other arrangements are possible. This functionality is assumed to include dynamic modification of asymmetric access state information, such as at least a portion of the ALUA/ANA state settings 312, as described in more detail elsewhere herein. The path selection logic 314 can include multiple distinct path selection logic instances for respective ones of a plurality of host devices of the system 300.

The IO processing logic 321 implemented in the storage array processor layer 340 performs various types of processing for servicing of read requests, write requests and other types of IO operations received from one or more host devices of the system 300. The controller logic 322 illustratively comprises various types of logic circuitry within or otherwise associated with one or more storage controllers of each of the storage arrays. In some embodiments, there may be separate instances of the IO processing logic 321 and the controller logic 322 for each of a plurality of storage arrays of the system 300.

The host-side components including path selection logic 314 and ALUA/ANA state settings 312 operate in conjunction with the storage-side components including IO processing logic 321 and controller logic 322 to implement at least portions of the functionality for dynamic configuration of logical storage devices as disclosed herein. More particularly, one or more MPIO drivers of the MPIO layer 332 illustratively identify a logical storage device accessible in at least first and second storage arrays, measure response times for accessing the logical storage device in each of the first and second storage arrays, and modify, based at least in part on the measured response times, asymmetric access state settings, illustratively at least a portion of the ALUA/ANA state settings 312, for the logical storage device. The one or more MPIO drivers illustratively utilize the ALUA/ANA state settings 312 in implementing path selection in path selection logic 314 for delivery of IO operations.

The MPIO layer 332 is an example of what is also referred to herein as a multi-path layer, and comprises one or more MPIO drivers implemented in respective host devices. Each such MPIO driver illustratively comprises an instance of path selection logic 314 configured to perform path selection for delivery of IO operations to the storage arrays of system 300 as previously described. As indicated above, the path selection logic 314 in some embodiments operates in conjunction with the ALUA/ANA state settings 312, the IO processing logic 321 and the controller logic 322 in implementing at least portions of the functionality for dynamic configuration of logical storage devices as disclosed herein.

For example, an MPIO driver of the MPIO layer 332 illustratively includes an instance of the path selection logic 314, and establishes the ALUA/ANA state settings 312 by interacting with multiple storage arrays to measure response times for accessing a given logical storage device in each of the storage arrays. The MPIO driver configures its instance of the path selection logic 314 to take the ALUA/ANA state settings 312 into account in selecting paths for delivery of IO operations to the one or more storage arrays. Additional or alternative layers and logic circuitry arrangements can be used in other embodiments.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment therefore selects paths for delivery of IO operations to the one or more storage arrays having the storage array ports of the storage array port layer 338.

In this illustrative embodiment, the host devices and storage arrays of system 300, through their respective instances of components 312, 321 and 322, provide functionality for dynamic configuration of logical storage devices as disclosed herein, possibly with involvement of other host device or system components, such as the path selection logic 314 of MPIO layer 332.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Figure 4A:
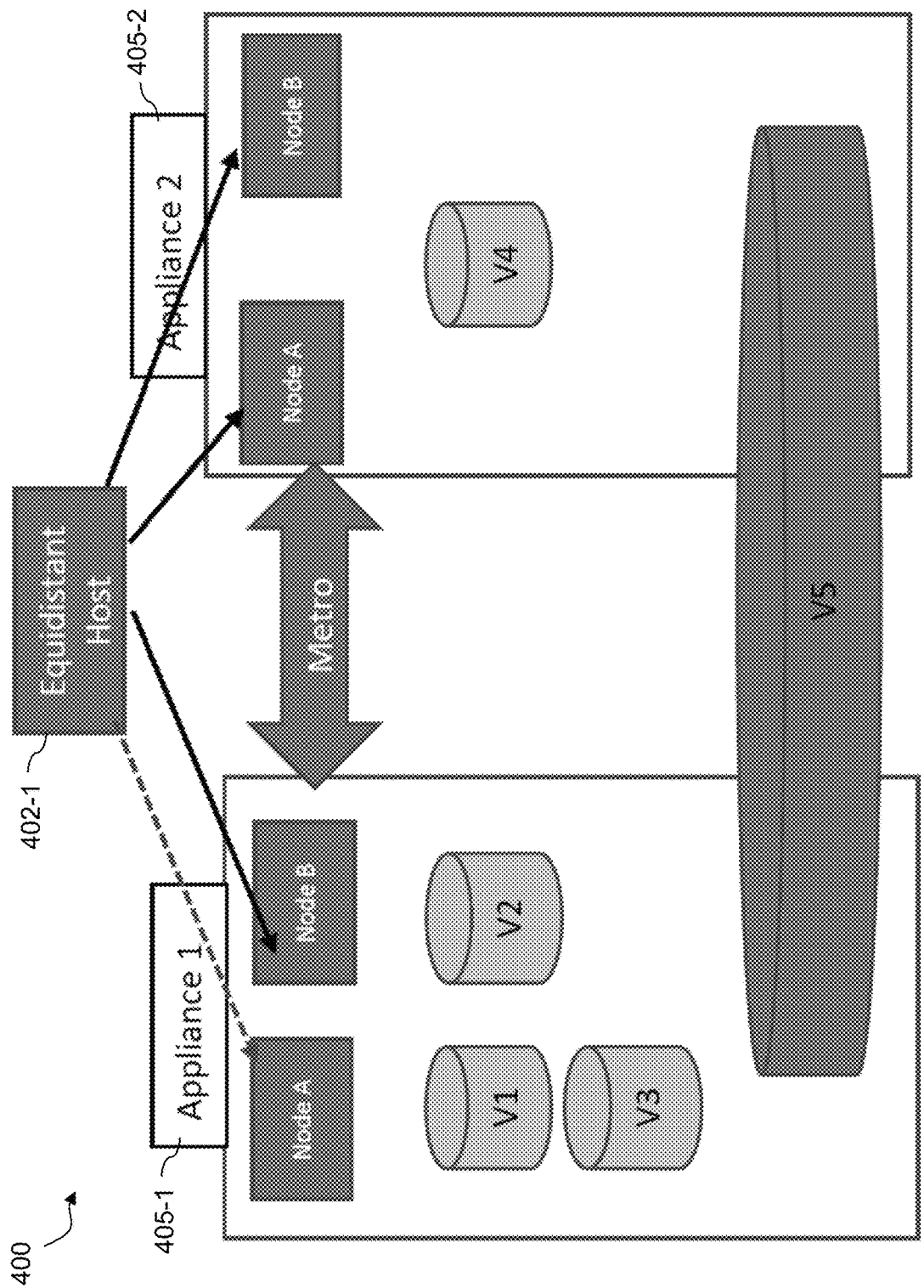
FIGS. 4A and 4B illustrate the operation of another illustrative embodiment of an information processing system configured with functionality for dynamic configuration of logical storage devices accessible across multiple storage systems.
Figure 4B:
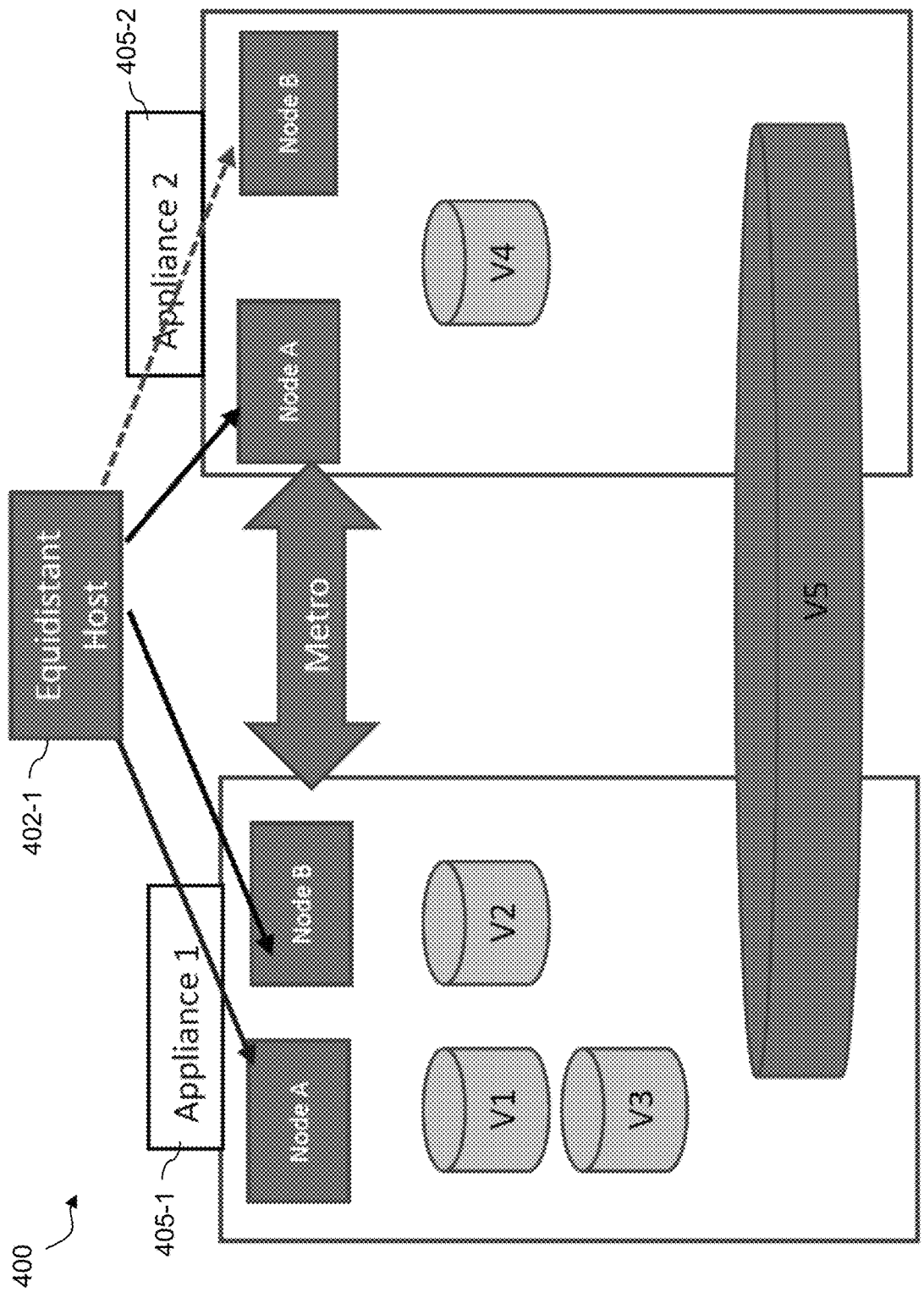

Referring now to FIGS. 4A and 4B, an information processing system 400 in another illustrative embodiment is shown. The system 400 is configured with functionality for dynamic configuration of logical storage devices accessible across multiple storage systems, as previously described. In this embodiment, the system 400 comprises a host device 402-1 coupled to first and second storage systems that are more particularly implemented as first and second storage arrays 405-1 and 405-2, also referred to as respective first and second "appliances" and denoted in the figures as Appliance 1 and Appliance 2. The first and second storage arrays 405 are illustratively arranged in a metro/stretched configuration, also referred to in the figure as simply a "metro" configuration, in which at least one logical storage device is accessible by the host device 402-1 across both the first and second storage arrays 405.

Each of the storage arrays 405 in this embodiment comprises two storage controllers, illustratively denoted in each storage array as Node A and Node B, respectively. The host device 402-1 is more particularly denoted as being implemented in an "equidistant host" arrangement, in which the first and second storage arrays 405 are located in close proximity to one another, such as within the same data center, so as to be considered substantially equidistant from the host device 402-1.

The storage arrays 405 each include one or more logical storage volumes that are accessible only in that storage array. For example, as illustrated, storage array 405-1 includes logical storage volumes V1, V2 and V3 that are accessible in storage array 405-1 but not in storage array 405-2. Similarly, storage array 405-2 includes logical storage volume V4 that is accessible in storage array 405-2 but not in storage array 405-1. The storage arrays 405 also include a metro/stretched logical storage volume V5 that is accessible across both of the storage arrays. In other words, IO operations targeting metro/stretched logical storage volume V5 can be directed by the host device 402-1 to either of the storage arrays 405.

An MPIO driver of the host device 402-1 initially detects the equidistant configuration by sending to each of the storage arrays 405 at least one command and processing the corresponding responses from the storage arrays 405. Such commands in some embodiments comprise commands that do not experience significant processing delays in the storage arrays 405, such as the SCSI vendor unique 0xC3 command, the SCSI TUR command, or the NVMe Identify command. The resulting measured response times illustratively comprise respective SAN round-trip times, primarily comprising SAN delay from the host device 402-1 to the respective storage arrays 405 rather than processing delay in the storage arrays 405.

If a difference between the measured response times to first and second such commands sent to the respective first and second storage arrays 405 is less than a specified threshold, the MPIO driver determines that the storage arrays 405 are in sufficiently close proximity to one another and are therefore in an equidistant configuration, and otherwise determines that the storage arrays 405 are not in sufficiently close proximity to one another and are therefore not in an equidistant configuration. Other types of additional or alternative commands can be used to detect whether or not the storage arrays 405 are in an equidistant configuration, including for example one or more read and/or write commands associated with respective IO operations, in any combination.

The MPIO driver of the host device 402-1 illustratively collects IO response times for all read/write IOs over a period of time, and normalizes the response times for various request sizes to a particular block size (e.g., 4K) to allow for easy comparison. In situations in which there is a heavy IO load consistently for a specified time threshold (e.g., 300 seconds), there would be spike in the read/write IO response times observed during that period. As the MPIO driver, as described above, has knowledge of the access latency to the second storage array 405-2, which is illustratively a "remote" appliance, relative to the access latency to the first storage array 405-1, which is illustratively a "local" appliance, the MPIO driver upon detection of the above-noted spike changes the access preference for one or more logical storage volumes of system 400, illustratively the metro/stretched volume V5, from a storage controller of the first storage array 405-1 to a storage controller of the second storage array 405-2. Such a change is illustratively carried out using explicit ALUA commands. As indicated elsewhere herein, explicit ALUA commands are standard SCSI commands which can be used to change the ALUA access preference.

The storage arrays 405 on receiving the explicit ALUA commands would illustratively change the ALUA access state settings from those shown in FIG. 4A to those shown in FIG. 4B. More particularly, in FIG. 4A, the dashed arrow from host device 402-1 to Node A of storage array 405-1 indicates the paths associated with the AO state, while the three solid arrows from host device 402-1 to Node B of storage array 405-1 and to Node A and Node B of storage array 405-2 indicate the paths associated with the ANO state. In FIG. 4B, the asymmetric access state settings have been changed by the MPIO driver, with the dashed arrow from host device 402-1 to Node B of storage array 405-2 indicating the paths associated with the AO state, while the three solid arrows from host device 402-1 to Node A and Node B of storage array 405-1 and to Node A of storage array 405-2 indicate the paths associated with the ANO state. Accordingly, after the asymmetric access state settings changes, path selection logic in the MPIO driver of the host device 402-1 will favor the paths to Node B in the second storage array 405-2 as illustrated in FIG. 4B, rather than the paths to the Node A in the first storage array 405-1 as illustrated in FIG. 4A. Numerous other changes to the asymmetric access state settings can be made over time as the response times vary, in order to balance the load across the storage controllers of the first and second storage arrays 405 for the logical storage volumes.

As a more particular example, assume that the MPIO driver of the host device 402-1 collects response times for each of the volumes V1, V2, V3, V4 and V5 over a specified time period (e.g., 300 seconds) and computes average response times for those volumes over the specified time period as RT1, RT2, RT3, RT4 and RT5, respectively. Further assume that the moving averages of the response times RT1, RT2, RT3 and RT5 gradually increase over multiple time periods, while the moving average of the response time RT4 does not change significantly over the multiple time periods but instead remains a threshold range. This situation indicates that the IO load on the second storage array 405-2, which includes volume V4 exhibiting response time RT4, has been steady over the multiple time periods and therefore the second storage array 405-2 has additional capacity to assist in processing IO load for other volumes, such as the metro/stretched volume V5.

Accordingly, the MPIO driver in response to this detected response time situation makes the adjustment in asymmetric access settings illustrated in FIG. 4B, so as to drive IO traffic for the metro/stretched volume V5 to the second storage array 405-2 via its path selection that is performed based on ALUA access preference.

The above-described systems, processes, algorithms and other features and functionality disclosed herein are presented by way of illustrative example only, and other embodiments can utilize additional or alternative arrangements.

Also, as mentioned previously, different instances of the above-described processes, algorithms and other techniques for aligned path selection can be performed by different MPIO drivers in different host devices, or using other types of host drivers, such as, for example, iSCSI drivers.

The particular arrangements described above are therefore presented by way of illustrative example only. Numerous alternative arrangements of these or other features can be used in implementing aligned path selection in other illustrative embodiments.

It is apparent from the foregoing that the illustrative embodiments disclosed herein can provide a number of significant advantages relative to conventional arrangements.

For example, some embodiments configure one or more host devices to each include functionality for dynamic configuration of logical storage devices accessible across multiple storage arrays or other types of storage systems.

These and other embodiments can provide significantly improved performance, for example, in situations in which the first and second storage systems are configured such that the host device communicates with the first storage system over one or more first sets of paths and communicates with the second storage system over one or more second set of paths, where the first and second sets of paths may have substantially different performance characteristics that can also vary widely over time, possibly due at least in part to temporarily excessive IO processing loads on one or more storage controllers of the corresponding storage system.

Moreover, illustrative embodiments avoid problems that might otherwise arise where a host device is subject to restrictions in its ability to adjust asymmetric access state settings, such as being unable to change the settings to give preference to paths to a storage controller on a remote storage system as opposed to a local storage system.

For example, some embodiments herein are configured to take advantage of so-called "equidistant host" arrangements, in which the first and second storage systems are located in close proximity to one another, so as to allow the host device to change the settings to give preference to paths to a storage controller on either storage system depending on dynamically-changing factors such as load-driven response times.

The disclosed functionality can be implemented using a wide variety of different host devices and storage systems.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as an Amazon Web Services (AWS) system, a Google Cloud Platform (GCP) system and a Microsoft Azure system. Virtual machines provided in such cloud-based systems can be used to implement a fast tier or other front-end tier of a multi-tier storage system in illustrative embodiments. A capacity tier or other back-end tier of such a multi-tier storage system can be implemented using one or more object stores such as Amazon S3, GCP Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a central processing unit (CPU), a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, network 104 and storage arrays 105 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, storage controllers, processors, memories, IO queues, MPIO drivers, path selection logic, asymmetric access state settings, and additional or alternative components. Also, the particular configurations of system and device elements and associated processing operations illustratively shown in the drawings can be varied in other embodiments. For example, a wide variety of different host device and storage system configurations, and associated asymmetric access state settings modification techniques, can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
  at least one processing device comprising a processor coupled to a memory;
  said at least one processing device being configured:
  to identify a logical storage device accessible in at least first and second storage systems;
  to measure response times for accessing the logical storage device in each of the first and second storage systems; and
  to modify, based at least in part on the measured response times, asymmetric access state settings for the logical storage device;
  wherein measuring response times for accessing the logical storage device in each of the first and second storage systems comprises sending one or more commands from a host device to each of the first and second storage systems, receiving responses to each of the one or more commands in the host device from each of the first and second storage systems, comparing in the host device the responses received from the first and second storage systems, the responses including at least a first response received from the first storage system and a second response received from the second storage system, and identifying in the host device that the host device is configured as an equidistant host device relative to the first and second storage systems, based at least in part on a result of the comparing of the responses from the first and second storage systems, by the host device, indicating that the first and second storage systems are less than a threshold distance apart from one another, wherein the comparing of the responses includes computing in the host device a computed distance between the first and second storage systems, based at least in part on the responses, and comparing the computed distance to the threshold distance, and wherein the modifying of the asymmetric access state settings for the logical storage device is performed responsive to the computed distance being less than the threshold distance.

2. The apparatus of claim 1 wherein said at least one processing device comprises at least a portion of a host device.

3. The apparatus of claim 1 wherein the first and second storage systems are arranged in an active-active configuration relative to one another.

4. The apparatus of claim 1 wherein the logical storage device comprises a metro/stretched logical storage volume.

5. The apparatus of claim 1 wherein modifying asymmetric access state settings for the logical storage device comprises modifying asymmetric logical unit access (ALUA) state settings for the logical storage device.

6. The apparatus of claim 1 wherein modifying asymmetric access state settings for the logical storage device comprises modifying asymmetric namespace access (ANA) state settings for the logical storage device.

7. The apparatus of claim 1 wherein said at least one processing device further comprises a multi-path layer that includes at least one multi-path input-output driver configured to control delivery of input-output operations from a host device to the first and second storage systems over selected paths through a network over which the host device communicates with the first and second storage systems.

8. The apparatus of claim 7 wherein the logical storage device is accessible to the multi-path layer via one or more first sets of paths to the first storage system and one or more second sets of paths to the second storage system.

9. The apparatus of claim 7 wherein the multi-path input-output driver is configured to send one or more commands to each of the first and second storage systems and to process corresponding command responses from the first and second storage systems, and to determine, based at least in part on a difference between at least one response time for the first storage system and at least one response time for the second storage system, whether or not the host device is configured as an equidistant host device relative to the first and second storage systems.

10. The apparatus of claim 1 wherein modifying asymmetric access state settings for the logical storage device comprises modifying an asymmetric access state for each of one or more storage controllers of each of the first and second storage systems from an active-optimized (AO) state to an active-non-optimized (ANO) state or vice versa.

11. The apparatus of claim 10 wherein each of the storage controllers has at least one port associated therewith in its corresponding one of the first and second storage systems.

12. The apparatus of claim 10 wherein modifying asymmetric access state settings for the logical storage device comprises modifying the asymmetric access states of respective first and second storage controllers of the first storage system from respective AO and ANO states to respective ANO and ANO states, and modifying the asymmetric access state of respective first and second storage controllers of the second storage system from respective ANO and ANO states to respective AO and ANO states.

13. The apparatus of claim 10 wherein said at least one processing device is further configured to perform path selection in a manner that favors accessing the logical storage device via paths to a storage controller having an AO state over paths to a storage controller having an ANO state.

14. The apparatus of claim 1 wherein measuring response times for accessing the logical storage device in each of the first and second storage systems comprises collecting response time measurements for respective input-output operations directed to the logical storage device over a designated period of time.

15. A computer program product comprising a non-transitory processor-readable storage medium having stored therein program code of one or more software programs, wherein the program code, when executed by at least one processing device comprising a processor coupled to a memory, causes said at least one processing device:

to identify a logical storage device accessible in at least first and second storage systems;

to measure response times for accessing the logical storage device in each of the first and second storage systems; and to modify, based at least in part on the measured response times, asymmetric access state settings for the logical storage device;

wherein measuring response times for accessing the logical storage device in each of the first and second storage systems comprises sending one or more commands from a host device to each of the first and second storage systems, receiving responses to each of the one or more commands in the host device from each of the first and second storage systems, comparing in the host device the responses received from the first and second storage systems, the responses including at least a first response received from the first storage system and a second response received from the second storage system, and identifying in the host device that the host device is configured as an equidistant host device relative to the first and second storage systems, based at least in part on a result of the comparing of the responses from the first and second storage systems, by the host device, indicating that the first and second storage systems are less than a threshold distance apart from one another, wherein the comparing of the responses includes computing in the host device a computed distance between the first and second storage systems, based at least in part on the responses, and comparing the computed distance to the threshold distance, and wherein the modifying of the asymmetric access state settings for the logical storage device is performed responsive to the computed distance being less than the threshold distance.

16. The computer program product of claim 15 wherein modifying asymmetric access state settings for the logical storage device comprises modifying asymmetric logical unit access (ALUA) state settings for the logical storage device.

17. The computer program product of claim 15 wherein modifying asymmetric access state settings for the logical storage device comprises modifying asymmetric namespace access (ANA) state settings for the logical storage device.

18. A method comprising:

identifying a logical storage device accessible in at least first and second storage systems;

measuring response times for accessing the logical storage device in each of the first and second storage systems; and modifying, based at least in part on the measured response times, asymmetric access state settings for the logical storage device;

wherein measuring response times for accessing the logical storage device in each of the first and second storage systems comprises sending one or more commands from a host device to each of the first and second storage systems, receiving responses to each of the one or more commands in the host device from each of the first and second storage systems, comparing in the host device the responses received from the first and second storage systems, the responses including at least a first response received from the first storage system and a second response received from the second storage system, and identifying in the host device that the host device is configured as an equidistant host device relative to the first and second storage systems, based at least in part on a result of the comparing of the responses from the first and second storage systems, by the host device, indicating that the first and second storage systems are less than a threshold distance apart from one another, wherein the comparing of the responses includes computing in the host device a computed distance between the first and second storage systems, based at least in part on the responses, and comparing the computed distance to the threshold distance, and wherein the modifying of the asymmetric access state settings for the logical storage device is performed responsive to the computed distance being less than the threshold distance; and wherein the method is performed by at least one processing device comprising a processor coupled to a memory.

19. The method of claim 18 wherein modifying asymmetric access state settings for the logical storage device comprises modifying asymmetric logical unit access (ALUA) state settings for the logical storage device.

20. The method of claim 18 wherein modifying asymmetric access state settings for the logical storage device comprises modifying asymmetric namespace access (ANA) state settings for the logical storage device.

* * * * *